April 5, 1932.  G. C. SAHNOW ET AL  1,852,219
MILK COOLER
Filed Oct. 13, 1930
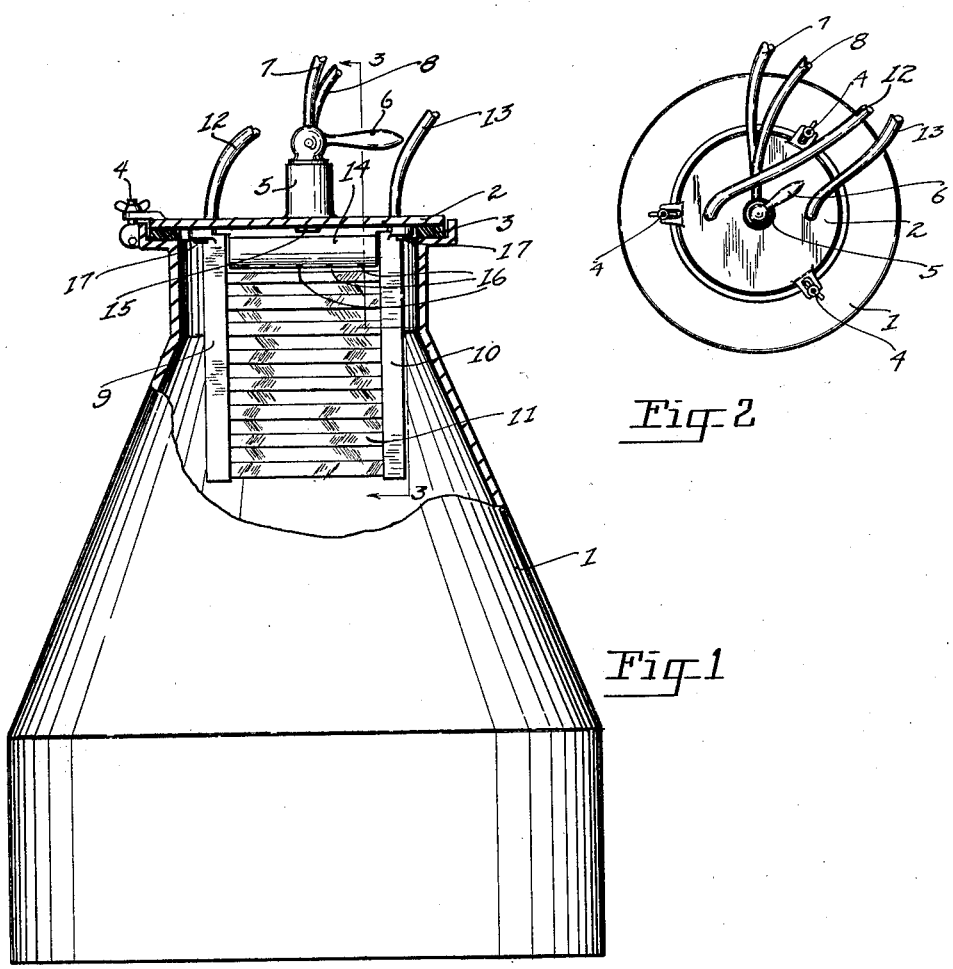
Fig-1
Fig-2
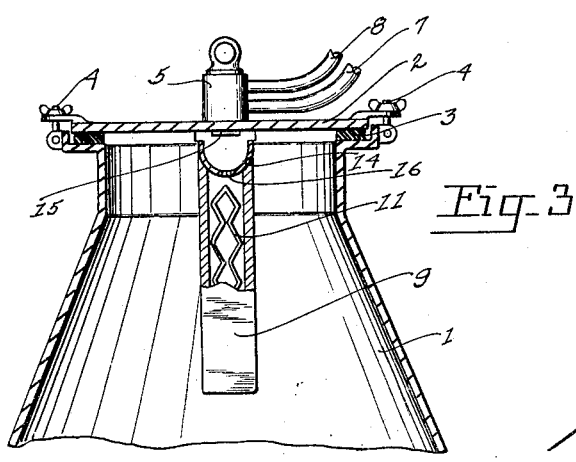
Fig-3
Gordon C. Sahnow
Wilbert Sahnow
INVENTOR
BY Thomas Bilyeu
ATTORNEY Patented Apr. 5, 1932

1,852,219

UNITED STATES PATENT OFFICE

GORDON C. SAHNOW AND WILBERT SAHNOW, OF HILLSBORO, OREGON

MILK COOLER

Application filed October 13, 1930. Serial No. 488,420.

Our invention is primarily intended for use in conjunction with the milk receptacle of milking machines and is intended for placement and being suspended from the lid, or closure, of the milk receiving receptacle with provision being provided for the passing of a refrigerating or cooling medium therethrough.

The invention consists primarily of a lid, or closure for the receptacle and through which the lines pass for admitting suction and milk therethrough and through which the cooling medium lines also pass. A cooler is suspended from the lid that has a milk receiving and distributing trough disposed immediately below, and in registerable alignment with, the point of deposit of the milk through the lid. Holes are disposed in the bottom of the trough to permit the warm milk being drained therefrom and being deposited upon corrugated surfaces over which the same drains. These corrugated surfaces are formed by two corrugated plates disposed between two headers so as to form a plurality of passageways connecting the said headers. Cooling fluid passes through, and the milk flows over these passageways.

Heretofore it has been the general custom in devices of this kind to extract the milk from the bovine and deliver the same into a closed milk receiving receptacle and when the milking has been completed, to cool the milk by pouring the same into a separate device. This required the exposing of the milk, one or more times, in an atmosphere and under working conditions that are not conducive to the health of the user of the milk, and that is especially not conducive to the maintaining of the milk in a condition to prevent the bacterial count of the milk from developing rapidly.

Through the use of our new and improved device the milk is delivered, by the receptacle and the same is cooled therein without the exposing of the milk, in the open atmosphere, and without the unnecessary handling of the same so that the milk, as soon as delivered in the milk receiving receptacle, is cooled immediately to thereby prevent and retard the bacterial growth within the milk content.

One of the objects of our invention is to eliminate time and labor in the handling of milk where milking machines are used in the extracting of milk from the bovine.

A further object of our invention consists in providing a milk cooler, that is placed within the milk receiving receptacle, of the milking machine, at which point the milk is immediately cooled after its extraction.

A still further object of our invention consists in providing a device for the handling of milk that may be maintained in the highest possible sanitary condition.

With these and incidental objects in view, the invention consists in certain novel features of construction and combination of parts, and essential elements of which are set forth in the appended claim, and a preferred form of embodiment of which is hereafter described with reference to the drawings which accompany and form part of the specification.

In the drawings:

Fig. 1 is a side view, partially in section, of the milk receiving receptacle and illustrating our new and improved device, disposed therein.

Fig. 2 is a top, plan view, of the mechanism illustrated in Fig. 1.

Fig. 3 is a fragmentary, sectional, side view of the top of the milk receiving receptacle and an end view, partially in section, of the milk cooler disposed therein; that is depending from the closure of the milk receiving receptacle.

Like reference characters refer to like parts throughout the several views.

1 is the milk receiving receptacle, having a lip or closure 2 disposed upon the receptacle with means for maintaining the same sealed; by the placing of a compressible gasket 3 within the top of the can and the compressing of the lid thereupon by compression screws 4. A head 5 is disposed centrally of the lid through which the lines pass that lead to the milking machine. A valve 6 is disposed within the head. The lines that lead to the milking machine are illustrated at 7 and 8. We place a milk cooler within the milk receiving receptacle and secure the same to the inside of the lid. We have found splendid results may be obtained by a cooler that is comprised of headers 9 and 10, that are spaced apart and secured together, by corrugated plates 11 so as to form passageways connecting the headers. A cooling medium is circulated through the cooler, the same being admitted into the header 9, through the pipe, or tube 12, and the cooling medium then passes through the passageways between the corrugated plates 11 and passes therefrom through the header 10 and the pipe or tube 13.

The cooling medium may be circulated under pressure by any suitable means as by being connected to the water system or by having a refrigerant circulating therethrough by mechanical or other means.

A distributing trough 14 is disposed in the upper end of the cooler, the top side of the same being open and in registerable alignment with the discharge outlet 15, that leads to the milking machine. Drain holes 16 are disposed in the bottom of the trough and the milk drains therethrough and flows over the corrugated surfaces where the heat is extracted through the cooling medium being circulated through the cooling device. The cooler may be removably secured to the lid or closure 2 by any suitable means as through the use of fastenings, as bolts 17.

While the form of mechanism herein shown and described is admirably adapted to fulfill the objects primarily stated, it is to be understood that it is not intended to confine the invention to the one form of embodiment herein shown and described, as it is susceptible of embodiment in various forms, all coming within the scope of the claim which follows.

What we claim is:

A device to be used with a milk receptacle of the class described comprising a closure for the milk receptacle adapted for making a tight fitting connection therewith, a pair of headers disposed in spaced relation and depending from the closure, said headers being hollow; a plurality of corrugated plates disposed between the headers and forming passageways connecting the headers, a trough having a plurality of drain holes disposed therein being disposed above the corrugated plates and between the headers, a valve head disposed upon the closure and being in communication with the inside of the milk receptacle, said head being in direct alignment with the trough, and pipes secured to the headers for circulating a cooling medium therethrough and through the passageways.

GORDON C. SAHNOW.
WILBERT SAHNOW.